C. R. BLOOD.
REMOVABLE STEERING WHEEL FOR AUTOMOBILES.
APPLICATION FILED APR. 26, 1920.
1,378,316.
Patented May 17, 1921.
2 SHEETS—SHEET 1.
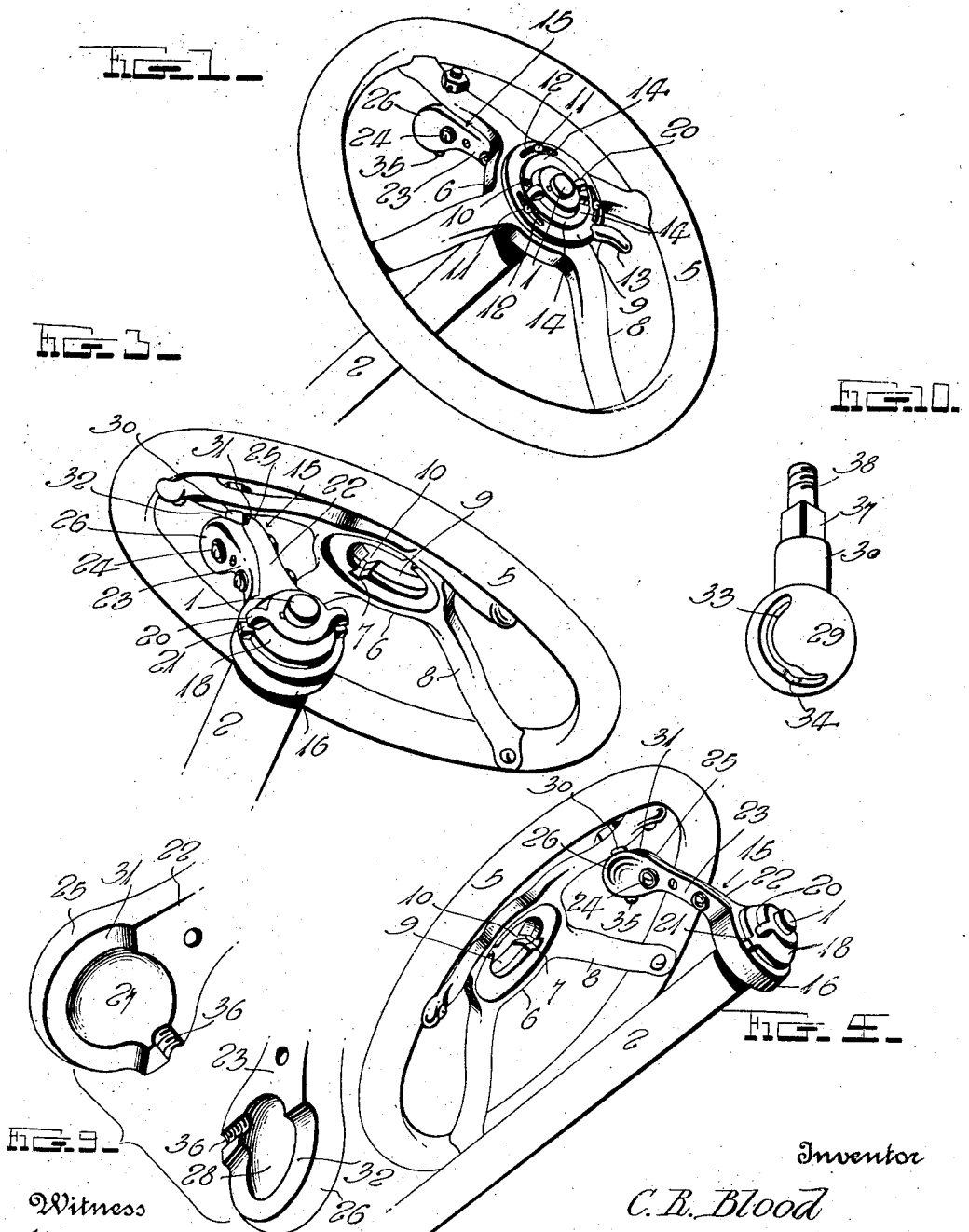

C. R. BLOOD.
REMOVABLE STEERING WHEEL FOR AUTOMOBILES.
APPLICATION FILED APR. 26, 1920.
1,378,316.
Patented May 17, 1921.
2 SHEETS—SHEET 2.
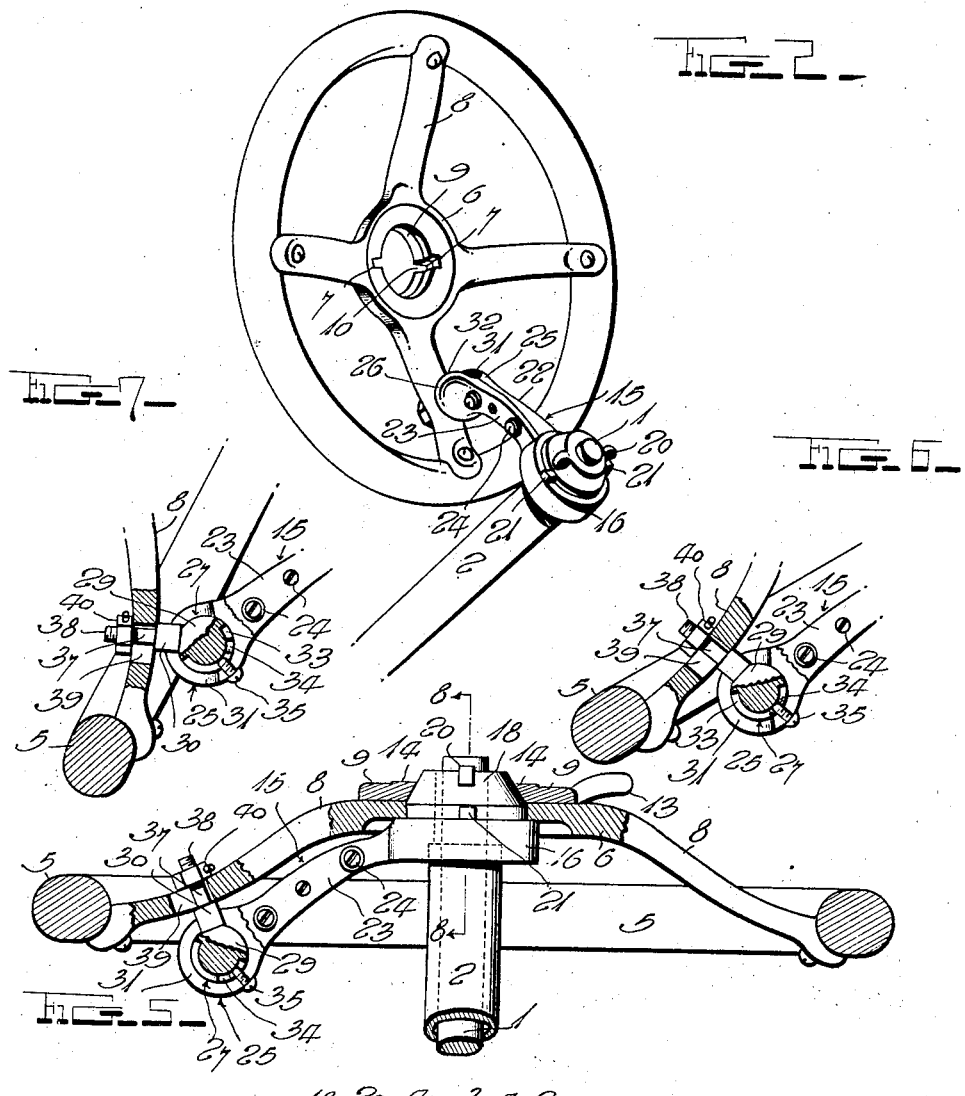
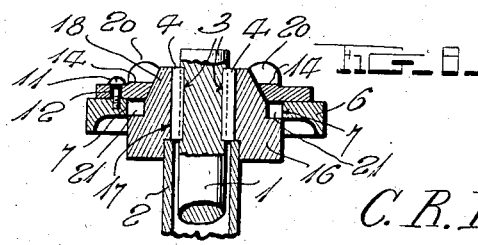
Witness
H. Woodard
Inventor
C. R. Blood
By H. B. Wilson &co
Attorneys

UNITED STATES PATENT OFFICE.

CLINTON R. BLOOD, OF STURGEON BAY, WISCONSIN.

REMOVABLE STEERING-WHEEL FOR AUTOMOBILES.

1,378,316.  Specification of Letters Patent.  Patented May 17, 1921.

Application filed April 26, 1920. Serial No. 376,745.

*To all whom it may concern:*

Be it known that I, CLINTON R. BLOOD, a citizen of the United States, residing at Sturgeon Bay, in the county of Door and State of Wisconsin, have invented certain new and useful Improvements in Removable Steering-Wheels for Automobiles; and I do declare the following to be a full, clear, and exact description of the invention, such as will enable others skilled in the art to which it appertains to make and use the same.

This invention relates to an improved steering wheel for use in connection with an automobile and one object of the invention is to provide a steering wheel having an improved mounting which permits the wheel to be moved from its normal position and swung to extend above or to a position in front of and substantially longitudinally of the steering post and which will also permit the wheel to be swung to either side of the steering post. This permits the wheel to be easily swung out of the way so that the driver of the automobile can take his place in the steering seat with the wheel swung out of the way and then swing the wheel back into place. It often happens that with a steering wheel connected with the post in the usual manner it will be exceedingly difficult to occupy the steering seat as the wheel extends very close to the steering seat. Another object of the invention is to provide an improved means for releasably holding the steering wheel in place upon the steering post. Another object of the invention is to so construct the locking means for the steering wheel that the wheel may be easily and quickly released or locked and very securely held in place upon the post when locked. Another object of the invention is to so construct this steering wheel that it may be applied to a steering post of an ordinary construction. Another object of the invention is to so construct this locking mechanism that the locking disk may be provided with cam strips which will constitute wedges fitting beneath lugs and serving to frictionally hold the locking disk against accidentally turning to a releasing position. This invention is illustrated in the accompanying drawings wherein, Figure 1 is a perspective view showing the improved steering wheel in position for use.

Fig. 2 is a perspective view showing the steering wheel swung upwardly to one of its inoperative positions.

Fig. 3 is a perspective view showing the steering wheel swung to one side.

Fig. 4 is a perspective view showing the steering wheel swung forwardly and downwardly to rest against the steering post.

Fig. 5 is a view of the steering wheel in an operative position, the view being partially in section and partially in elevation.

Fig. 6 is a fragmentary sectional view showing the construction of the ball and socket joint which connects the steering wheel with the arm mounted upon the steering post.

Fig. 7 is a view similar to Fig. 6 showing the steering wheel partially swung to a raised position.

Fig. 8 is a sectional view through the hub of the steering wheel and post, the view being taken along the line 8—8 of Fig. 5.

Fig. 9 is an enlarged view showing the construction of the socket portion of the ball and socket joint.

Fig. 10 is a perspective view of the ball portion of the ball and socket joint.

This steering wheel is used in connection with a conventional construction of steering post 1 which passes through the usual casing 2 and has its upper end portion provided with the usual grooves or key-ways 3 into which the keys 4 will fit. The steering wheel 5 is provided with a hub 6 having side notches 7 and this hub is provided with the usual spoke extensions 8. The locking disk 9 fits against the outer or upper face of the hub and is provided with side notches 10 which are adapted to register with the notches 7 when the disk is turned to the releasing position shown in Fig. 2. This disk is held in place by securing pins 11 which pass through arcuate slots 12 in the disk and in order to permit the disk to be easily turned, there has been provided a handle extension 13. It must be seen that the disk can be very easily turned from a releasing position to a locking position or from a locking position to a releasing position. It should be further noted that the disk has its central portion provided with annular ribs or thickened portions 14 which will constitute wedges or cams for a purpose to be hereinafter brought out.

This steering wheel is connected with the post by means of a bracket 15 which is provided at one end with a collar 16 to fit upon the post above the casing 2 with the casing extending up into the collar as shown in Fig. 8. This collar is provided with keyways 17 which will be cut to extend in operative relation to the key-ways 3 and therefore when the keys 4 are driven into place to extend into the key-ways 3 and 17 the collar will be securely locked upon the steering post and when the collar is turned the steering post will be turned with it. The upper portion 18 of this collar is reduced to provide a neck for extending through the central opening of the wheel hub 6 and through the central opening of the locking disk 9. Upon opposite sides the neck is provided with lugs or fingers 20 and 21, the lugs 20 extending through the registering notches 7 and 10 to a position above the outer face of the disk 9 and the lugs 21 extending into the notches 7 when the wheel is swung downwardly to the operative position. When in this position the locking disk will be rotated through the medium of the handle extension 13 and the cam strips or wedges 14 will engage the under faces of the lugs 20 and thus create a binding engagement which will frictionally prevent the locking disk from accidentally turning to a releasing position which would permit the wheel to swing out of proper engagement with the collar.

This bearing bracket has a curved arm extension 22 which extends outwardly and downwardly as shown in Fig. 5 and is provided with a removable side section 23 releasably held in place by bolts or other releasable fasteners 24. This arm 22 is provided at its free end with an enlarged head 25 and the removable side section 23 is provided with a similar head 26, the two heads being hollowed out as shown at 27 and 28 in Fig. 9 to provide a socket for receiving the ball 29 carried by the stem 30. The contacting faces of the two heads 25 and 26 are further cut away as shown at 31 and 32 to provide a groove through which the neck 30 extends when the ball is in place. From an inspection of Fig. 10 it will be seen that this ball is provided with a radially extending groove 33 from a point to one side of the axis of the stem 30 past the axis and upon the opposite side of the axis to a point adjacent the inner end of the stem. At a point intermediate the length of this groove 33 there has been provided side notches thus forming a pocket 34 positioned substantially in alinement with the axis of the stem 30. This groove 33 is provided to receive the locking pin 35 which is threaded through the internally threaded opening formed by the coöperating notches 36 of the two heads 25 and 26. From an inspection of Fig. 10 it will be noted that stem 30 has its outer end portion reduced and cut rectangular in cross section as at 37 and is then further reduced as shown at 38 and threaded so that after the rectangular portion of the stem has been passed through the elongated opening 39 in one of the spokes 8 the securing nut 40 may be screwed upon the threaded end portion 38 and the wheel thus connected with the stem.

When this wheel is in use the collar will be secured upon the upper end portion of the steering post as shown in Fig. 8 and the steering wheel will normally be in the position shown in Fig. 1 with the neck 18 extending through the wheel hub and the wheel locked by means of the locking disk 9. When it is desired to swing the wheel out of the way, the locking disk will be turned to the releasing position and the wheel will then be released from the collar and may be swung to the position shown in Fig. 2 where it will rest as shown with the pin 35 positioned at the end of the groove 33 near the stem. The pin will prevent the ball 29 from rotating in the socket and the square portion of the stem will prevent the wheel from swinging to one side. If it is desired to swing the wheel to one side as shown in Fig. 3 or to the opposite side, it is simply necessary to release the wheel and after raising it a sufficient distance to be free from the collar, swing it to one side. When the wheel is swung upwardly a sufficient distance to be free from the collar, the pin 35 will be positioned in the pocket 34 where it will be in alinement with the axis of the stem 30 and the stem 30 can then rotate thus permitting the wheel to be swung to the position shown in Fig. 3 or to a similar position upon the opposite side of the post. If it is desired to position the wheel as shown in Fig. 4 the wheel will be swung from the position shown in Fig. 3 to a position in front of the steering post and the wheel can then be dropped to the position shown in this figure with the pin 35 moving through the groove. The steering wheel may thus be swung to practically any position desired which will be convenient when it is desired to swing the wheel out of the way and further, the wheel may be swung to any one of the positions shown and may then be locked by a suitable lock and thus use of the automobile prevented. When it is desired to again use the automobile it is simply necessary to return the wheel to the operative engagement with the collar and rotate the locking disk to the locking position thus releasably holding the wheel in the operative position.

I claim:

1. A steering wheel having a hub, a bracket having at one end a collar for connection with a steering post and for extending through the hub of the steering wheel, means to releasably lock the steering wheel upon the collar, and a stem carried by the bracket for universal movement and having connection with one of the spokes of the steering wheel to mount the steering wheel for vertical and horizontal swinging movement when released from the collar and swung upwardly clear of the post.

2. A steering wheel having a hub and spokes, a bearing bracket for connection with a steering post having a collar extension for passing through the hub of the steering wheel, means carried by the steering wheel hub for releasably holding the wheel upon the collar extension, and means carried by the bearing bracket for universal movement and having connection with one of the spokes of the wheel to mount the wheel for vertical and horizontal swinging movement when released from the collar extension.

3. A steering wheel having a hub provided with side notches, a locking disk rotatably connected with the hub of the wheel and provided with side notches and having cam surfaces, a bracket for fitting upon a steering post having a collar extension for passing through the hub and locking disk, the collar being provided with side lugs for fitting into the notches of the hub and with a second set of lugs for passing through the alined notches of the hub and disk to a position above the disk for engagement with the cam surfaces of the disk when the disk is rotated to a locking position, and means for connecting the outer end portion of the bracket with one of the spokes of the wheel to mount the wheel for swinging movement when released from the collar.

4. A steering wheel having a hub, a bearing bracket having a collar adapted for connection with a steering post and for extending through the hub of the wheel, means for locking the wheel upon the collar for turning the steering post with the wheel, a stem having a ball fitting into a socket of the bearing bracket for universal movement, the stem having a squared extension extending through an elongated opening in one of the spokes of the wheel, and the outer end portion of the stem being further reduced and threaded for engagement by a locking nut holding the wheel upon the stem.

5. A steering wheel having a hub and spokes, a bracket having one end portion adapted for connection with a steering post and for passing through the hub, means to lock the wheel upon the extension of the bracket, a stem having a ball fitting a socket of the bracket and provided with a radially extending groove enlarged at a point substantially in alinement with the axis of the stem, the stem extending through a radial slot formed in the socket and having a reduced and squared extension passing through an opening formed in one of the spokes, and means for retaining the wheel in place upon the stem.

6. A steering wheel having a hub and spokes, a bracket having one end portion adapted for connection with a steering post and for passing through the hub, means to releasably lock the hub portion of the wheel in place upon the bracket, the opposite end portion of the bracket being provided with a socket having a side slot extending radially of the socket, a stem connected with one of the spokes of the wheel and provided with a ball fitting into the socket and having a radially extending groove, and a pin carried by the socket and extending into the groove.

7. A steering wheel having a hub portion, a bracket adapted for connection with a steering post, means to releasably hold the hub portion of the wheel in engagement with the bracket, and means carried by the bracket for engaging the wheel and mounting the wheel for vertical and horizontal swinging movement when the hub portion of the wheel is released from the bracket and tilted upwardly.

In testimony whereof I have hereunto set my hand.

CLINTON R. BLOOD.

Witnesses:
  JOHN M. PERRY,
  GROVER M. STAPLETON.